US008078329B2

(12) United States Patent
Boeckx et al.

(10) Patent No.: US 8,078,329 B2
(45) Date of Patent: Dec. 13, 2011

(54) SYSTEM FOR REJECTION OF TABLETS PRODUCED IN A ROTARY TABLET PRESS AND A METHOD OF REJECTION OF TABLETS

(75) Inventors: Jurgen Boeckx, Steenokkerzeel (BE); Dirk Christiaens, Roosdaal (BE); Ivo Van Den Mooter, Willebroek (BE)

(73) Assignee: Courtoy NV, Halle (BE)

( * ) Notice: Subject to any disclaimer, the term of this patent is extended or adjusted under 35 U.S.C. 154(b) by 427 days.

(21) Appl. No.: 12/443,364

(22) PCT Filed: Sep. 29, 2006

(86) PCT No.: PCT/IB2006/053567
§ 371 (c)(1), (2), (4) Date: Mar. 27, 2009

(87) PCT Pub. No.: WO2008/038070
PCT Pub. Date: Apr. 3, 2008

(65) Prior Publication Data
US 2010/0094449 A1 Apr. 15, 2010

(51) Int. Cl.
*G05D 11/00* (2006.01)
*B07C 5/00* (2006.01)

(52) U.S. Cl. ........ 700/283; 700/206; 700/282; 700/301; 209/644

(58) Field of Classification Search .................. 700/110, 700/204, 206, 283, 301; 425/3, 78, 110, 425/135, 136, 149, 182, 193, 345, 353, 454; 73/37, 865.8; 264/40.1, 40.5, 409; 221/1, 221/3, 7, 13, 267, 278; 209/21, 22, 44.1, 209/557, 561, 576, 644; 222/630; 406/29, 406/30, 31, 108; 454/238
See application file for complete search history.

(56) References Cited

U.S. PATENT DOCUMENTS
4,817,006 A 3/1989 Lewis
(Continued)

FOREIGN PATENT DOCUMENTS
EP 1 247 640 A1 10/2002
(Continued)

*Primary Examiner* — Dave Robertson
(74) *Attorney, Agent, or Firm* — Sughrue Mion, PLLC

(57) ABSTRACT

A system for rejection of tablets produced in a rotary tablet press comprises pan ejection nozzle for sorting out defective tablets. The ejection nozzle is supplied with compressed gas through a supply line having an inlet end for connection with a source of compressed gas and an outlet end communicating with the ejection nozzle. The supply line is provided with a control valve controlled by a control unit in order to open the supply line when a defective tablet has been detected by the control unit. Furthermore, the supply line is provided with a sensor arranged between the control valve and the inlet end of the supply line and adapted to detect a variable indicative of a gas flow through the control valve in order for the control unit to generate an error signal in the case of malfunction of the control valve.

16 Claims, 3 Drawing Sheets

U.S. PATENT DOCUMENTS

| | | | | |
|---|---|---|---|---|
| 5,819,953 | A * | 10/1998 | Julius et al. | 209/561 |
| 6,631,826 | B2 * | 10/2003 | Pollard et al. | 221/156 |
| 6,918,493 | B2 * | 7/2005 | Hinzpeter et al. | 209/644 |
| 7,740,140 | B2 * | 6/2010 | Schmidt et al. | 209/552 |
| 7,749,053 | B2 * | 7/2010 | Behns et al. | 454/238 |
| 7,988,017 | B2 * | 8/2011 | Kulberg et al. | 221/267 |
| 2002/0134713 | A1 | 9/2002 | Hinzpeter et al. | |
| 2005/0200038 | A1 * | 9/2005 | Vogeleer et al. | 264/40.1 |
| 2006/0124656 | A1 * | 6/2006 | Popovich | 221/9 |
| 2007/0012604 | A1 * | 1/2007 | Basford | 209/644 |

FOREIGN PATENT DOCUMENTS

| | | | |
|---|---|---|---|
| GB | 1025147 | A | 4/1966 |
| GB | 1179350 | A | 1/1970 |

* cited by examiner

SYSTEM FOR REJECTION OF TABLETS PRODUCED IN A ROTARY TABLET PRESS AND A METHOD OF REJECTION OF TABLETS

FIELD OF THE INVENTION

The present invention relates to a system for rejection of tablets produced in a rotary tablet press, comprising an ejection nozzle for direction of a gas jet at a tablet to be rejected, so that the tablet is redirected and thereby sorted out from the remaining tablets leaving the tablet press during production, the ejection nozzle being supplied with compressed gas through a supply line having an inlet end for connection with a source of compressed gas and an outlet end communicating with the ejection nozzle, the supply line being provided with a control valve controlled by a control unit in order to open the supply line when a tablet to be sorted out has been detected by the control unit, and the supply line being provided with a sensor adapted to detect a variable indicative of a gas flow through the control valve in order for the control unit to generate an error signal in the case of malfunction of the control valve.

BACKGROUND OF THE INVENTION

EP 1 247 640 B1 describes a device for sorting out tablets from a rotary tablet press, whereby a nozzle via a line and a controllable valve disposed in the line is adapted to be connected to a pressure source in order to route a tablet into a reject duct. Between the orifice of the nozzle and the valve is arranged a pressure sensor that delivers a sensor signal if the valve is opened or a predetermined minimum pressure prevails in the line. An error signal is produced, if no sensor signal is detected, when the valve is controlled to open. In this way, the opening of the valve may be monitored. However, if the orifice of the nozzle is choked up, the pressure sensor will also deliver a sensor signal, when the valve is opened, and consequently this malfunction will not be detected by the device.

SUMMARY OF THE INVENTION

The object of the present invention is to provide a system for rejection of tablets, whereby the system has improved performance.

In view of this object, the sensor is arranged in the supply line between the control valve and the inlet end of the supply line.

In this way, it is possible to arrange the control valve closer to the ejection nozzle and thereby obtain a better and faster reaction time of the gas jet by means of which the tablet is rejected. Thereby a more precise rejection of the tablet may be achieved. Also a faster rejection can be achieved, which is important, because the production speed, that is the rotary speed of the turret, of modern rotary tablet presses is ever increasing. At the same time, no sensor signal will be detected in the case that the control valve opens and the ejection nozzle is blocked, because there is no gas flow through the control valve. In this case, an error signal may be generated both if the control valve should not function properly and if the nozzle should be clogged up. Consequently, a good monitoring of the rejection of tablets may be obtained, and thereby a better performance of the system may be achieved.

In an embodiment, the control valve is arranged next to the ejection nozzle. Thereby, an even more precise control of the ejection time may be obtained due to the short flow distance between the control valve and the ejection nozzle, and consequently, an even better performance of the system may be achieved. Specifically, this execution makes it possible to reject a single tablet. Without this feature, in prior art systems, typically three or four tablets are rejected at a time, although only one of these needs to be rejected. The advantage is that there are fewer tablets rejected, and consequently there is less scrap, and the tabletting yield is higher. Furthermore, this execution makes it possible to use the reject system to perform a single sampling, that is sampling of a single tablet during production. In prior art presses, it is not possible to use the system of rejection for sampling of single tablets due to the fact that more than one tablet are rejected at a time.

To assess, investigate, validate or trouble-shoot the tabletting process, it is an advantage to be able the reject and sample the tablets pressed by specific punches of the tablet press. Furthermore, for instance, the tablet pressed by a specific punch could be rejected and sampled during a number of revolutions, if the control system indicates that this tablet is slightly off the mean target value.

In a structurally advantageous embodiment, the system comprises an ejection finger adapted to guide tablets from a die table of the tablet press into a first channel of a tablet chute, and the ejection nozzle is arranged in the ejection finger in order to direct tablets into a second channel of the tablet chute.

In a structurally advantageous embodiment, the ejection finger has a fixed end adapted to be mounted beside the die table and a free end to be located above the die table, and the control valve is located at the free end of the ejection finger. Thereby, it is an advantage that the valve can be located closer to the nozzle.

In a structurally advantageous embodiment, the control valve is integrated in the ejection finger. Thereby, it is an advantage that the valve can be located closer to the nozzle.

In an embodiment, the sensor is arranged at the fixed end of the ejection finger. This is advantageous, because it is possible to choose every kind of sensor, regardless of the size of it.

In an embodiment, the fixed end of the ejection finger is mounted on the top of a pole mounted on a dividing wall of a tablet press, and wherein the sensor is arranged below the dividing wall and under the pole. This is advantageous, because it is possible to choose every kind of sensor, regardless of the size of it.

In an embodiment, the supply line is integrated into the pole and the ejection finger. Thereby, the unit is easier to clean, which is an advantage in the pharmaceutical industry.

In an embodiment, the sensor is a pressure sensor, and the control unit is adapted to generate an error signal, if a predetermined drop of the pressure measured by the pressure sensor is not detected by the control unit, when the control valve is opened. When the sensor is a pressure sensor, and it is positioned in the supply line before the control valve, no sensor signal will be detected in the case that the control valve opens and the ejection nozzle is blocked, because there is no gas flow through the control valve, and consequently no pressure drop before the control valve. This is an advantage, because as a result, an error signal will not only be generated, if the control valve does not open, but also if the ejection nozzle is blocked.

In an embodiment, the predetermined drop of pressure is at least 2 percent, and preferably at least 3 percent.

In an embodiment, the control unit is adapted to monitor the pressure measured by the pressure sensor, when the control valve is closed, and to generate an error signal in case that the pressure goes under a minimum pressure. Thereby, the correct performance of the system may be even better secured.

In an embodiment, the sensor is a flowmeter, such as a differential pressure flowmeter, an ultrasonic flowmeter, a target flowmeter, a coriolis mass flowmeter or any kind of suitable flowmeter. Also in this case, no sensor signal will be detected, in the case that the control valve opens and the ejection nozzle is blocked, and an error signal may be generated.

In an embodiment, a rotary tablet press comprises the system for rejection of tablets.

The invention furthermore relates to a method of rejection of tablets produced in a rotary tablet press, whereby a gas jet is directed at a tablet to be rejected, so that the tablet is redirected and thereby sorted out from the remaining tablets leaving the tablet press during production, whereby the compressed gas is supplied to the ejection nozzle through a supply line from a source of compressed gas, whereby a control valve arranged in the supply line opens for the supply of gas when it receives a control signal from a control unit, the control unit sending the control signal to the control valve when it has detected a tablet to be sorted out, whereby a sensor arranged in the supply line detects a variable indicative of a gas flow through the control valve, and whereby the system generates an error signal in the case of malfunction of the control valve.

The method is characterized by that the variable is detected by the sensor in the supply line from the source of compressed gas to the control valve. Thereby, the above-mentioned advantages may be obtained.

In an embodiment, the control valve opens for the gas flow next to the ejection nozzle. Thereby, the above-mentioned advantages may be obtained.

In an embodiment, successful tablets are guided by means of an ejection finger from a die table of the tablet press into a first channel of a tablet chute, and defective tablets are directed into a second channel of the tablet chute by means of a gas jet ejected through an ejection nozzle arranged in the ejection finger. Thereby, the above-mentioned advantages may be obtained.

In an embodiment, the control valve is opened inside the ejection finger. Thereby, the above-mentioned advantages may be obtained.

In an embodiment, the variable detected by the sensor is a pressure signal, whereby the control unit generates an error signal, if a predetermined drop of the pressure measured by the pressure sensor is not detected by the control unit, when the control valve is opened. Thereby, the above-mentioned advantages may be obtained.

In an embodiment, the predetermined drop of pressure is at least 2 percent, and preferably at least 3 percent.

In an embodiment, the pressure measured by the pressure sensor is monitored by the control unit, when the control valve is closed, and an error signal is generated in case that the pressure goes under a minimum pressure. Thereby, the above-mentioned advantages may be obtained.

In an embodiment, the variable detected by the sensor is flow signal, and the flow signal is measured by means of a differential pressure flowmeter, an ultrasonic flowmeter, a target flowmeter, a coriolis mass flowmeter or any kind of suitable flowmeter.

In an embodiment, a method of tabletting comprises the method of rejection of tablets. Thereby, the above-mentioned advantages may be obtained.

The invention will now be explained in more detail below by means of examples of embodiments with reference to the very schematic drawing, in which

DETAILED DESCRIPTION

Figure 1:
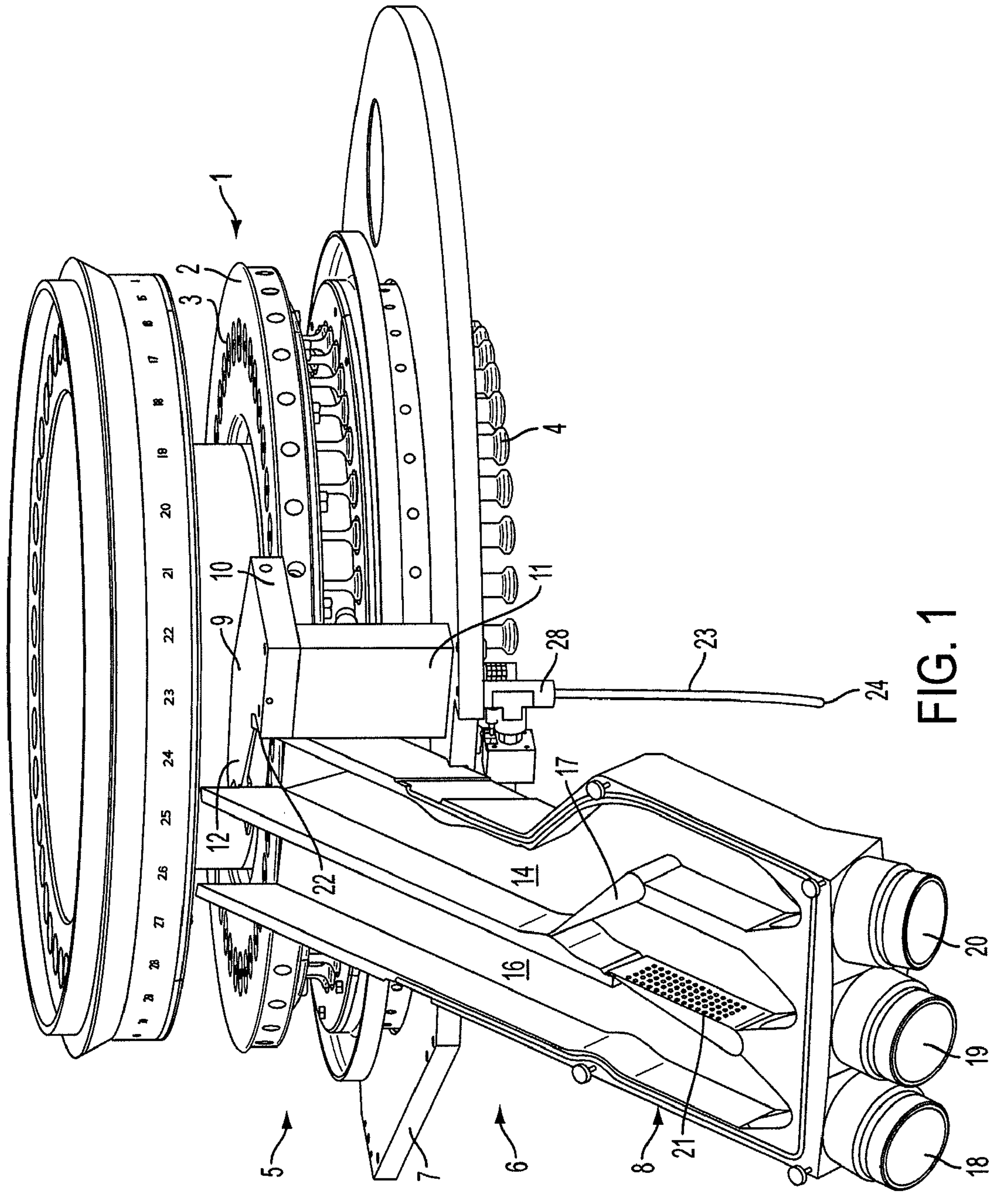
FIG. 1 is a perspective view of the turret of a rotary tablet press incorporating a system for rejection of tablets according to the invention.

FIG. 1 shows a turret 1 of a rotary tablet press for compression of a feedstock in the form of powder or granular material into tablets, compacts or the like. The press shown is of a type suitable for use in the pharmaceutical industry, but the press according to the invention may as well be a so-called industrial press employed in the production of a variety of different products, such as vitamins, pet food, detergents, explosives, ceramics, batteries, balls, bearings, nuclear fuels, etc.

The rotary turret 1 comprises a die table 2 having a number of dies 3 arranged evenly distributed along its circumference, each die having the form of a bore arranged with its axis parallel to the vertical rotational axis of the turret. On either side of the die table are arranged top and bottom punches, respectively, of which only the bottom punches 4 are shown, in corresponding guides accommodated in the turret so that a first end of each punch is able to enter a corresponding die by displacement of the punch in its guide in order to compress material in the die.

A second end of each punch is in a well-known manner co-operating with not shown top and bottom cams, respectively, arranged stationary in relation to the press housing in order to effect axial displacement of the punches by rotation of the turret 1. The turret is located in a central section, designated the compression section 5, of a not shown press housing is composed of three sections, which are located on top of each other and are separated by means of partition walls. The lower section, designated the drive section 6, is separated from the compression 5 section by a lower partition wall 7, and the compression section 5 is separated from a not shown upper section, designated the accessory section, by a not shown upper partition wall.

The tablet press is provided with a tablet chute 8 protruding from the periphery of the die table 2 for conducting away compressed material in the form of tablets from the dies. The tablet chute 8 comprises a tablet discharge device in the form of a so-called ejection finger 9 in order to collect and guide the tablets from the dies 3 and lead them out through the tablet chute 8. The ejection finger 9 projects above the die table 2 and has a fixed end 10 fastened to an upper end of a pole 11, the lower end of which is fastened on the upper side of the lower partition wall 7. The ejection finger 9 further has a free end 12 located right above the die table 2.

A curved guide plate 13 of the ejection finger 9 is adapted to lead the properly pressed tablets to a first channel 14 of the tablet chute 8. Furthermore, the ejection finger 9 is provided with a sorting apparatus in the form of a ejection nozzle 15 adapted to lead defective tablets to a second channel 16 of the tablet chute 8 by blowing the tablets away from their normal path that follows the guide plate 13 and leads them into the first channel 14.

Figure 2:
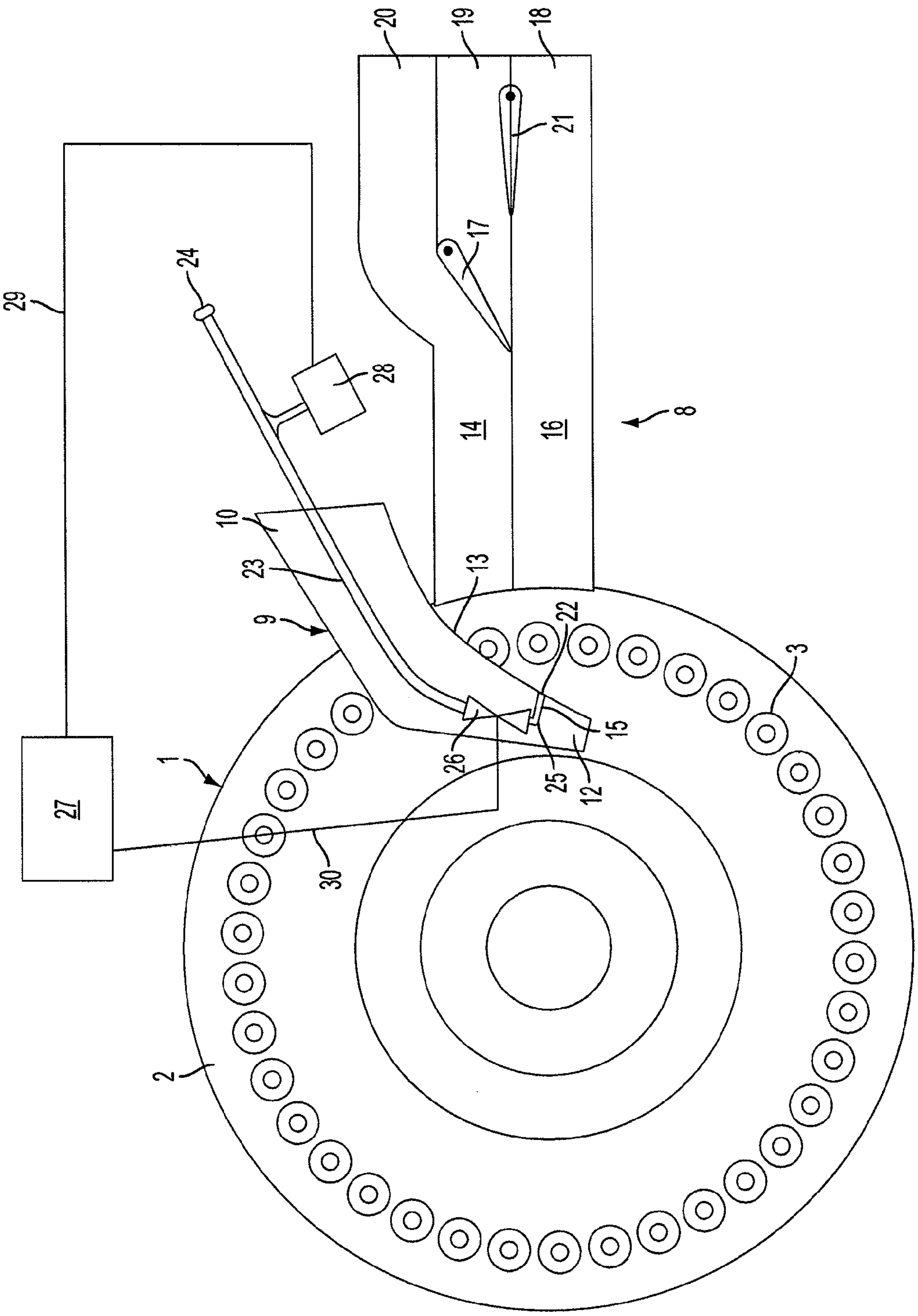
FIG. 2 is a top view of the turret of the rotary tablet press of FIG. 1.

Tablets led into the first channel 14 of the tablet chute 8 may by means of a pivotal guide flap 17 be directed either into a middle outlet 19 dedicated to properly pressed tablets made in automatic mode of the tablet press or into a right outlet 20 dedicated to sampled tablets made either in automatic or manual mode. In FIGS. 1 and 2 the pivotal guide flap 17 is in its left position, so that tablets are guided to the right outlet 20. When the tablets are guided to the middle outlet 19, the pivotal guide flap 17 is in its not shown straight position, and another pivotal guide flap 21 has to be in its straight position, as shown in FIGS. 1 and 2. In this straight position of the pivotal guide flap 21, tablets led into the second channel 16 are guided to a left outlet 18 dedicated to rejected tablets or tablets made in manual mode of the tablet press. If on the other hand, the pivotal guide flap 17 is in its straight position and the pivotal guide flap 21 is in its not shown right position, tablets led into the first channel 14 are directed to the left outlet 18 dedicated to rejected tablets or tablets made in manual mode.

The pivotal guide flap 21 is used to switch from its right position in manual mode, whereby the operator sets the press, the control system is inactive, and tablets made are defective tablets, to its straight position in automatic mode, whereby the control system is active and tablets made are properly pressed tablets. The pivotal guide flap 17 deviates tablets either in manual mode or automatic mode to the sampling outlet, the right outlet 20.

The outlets 18, 19, 20 may lead the tablets directly into containers and may be provided with a closing mechanism, or they may be connected to a further system of channels by means of couplings.

Figure 3:
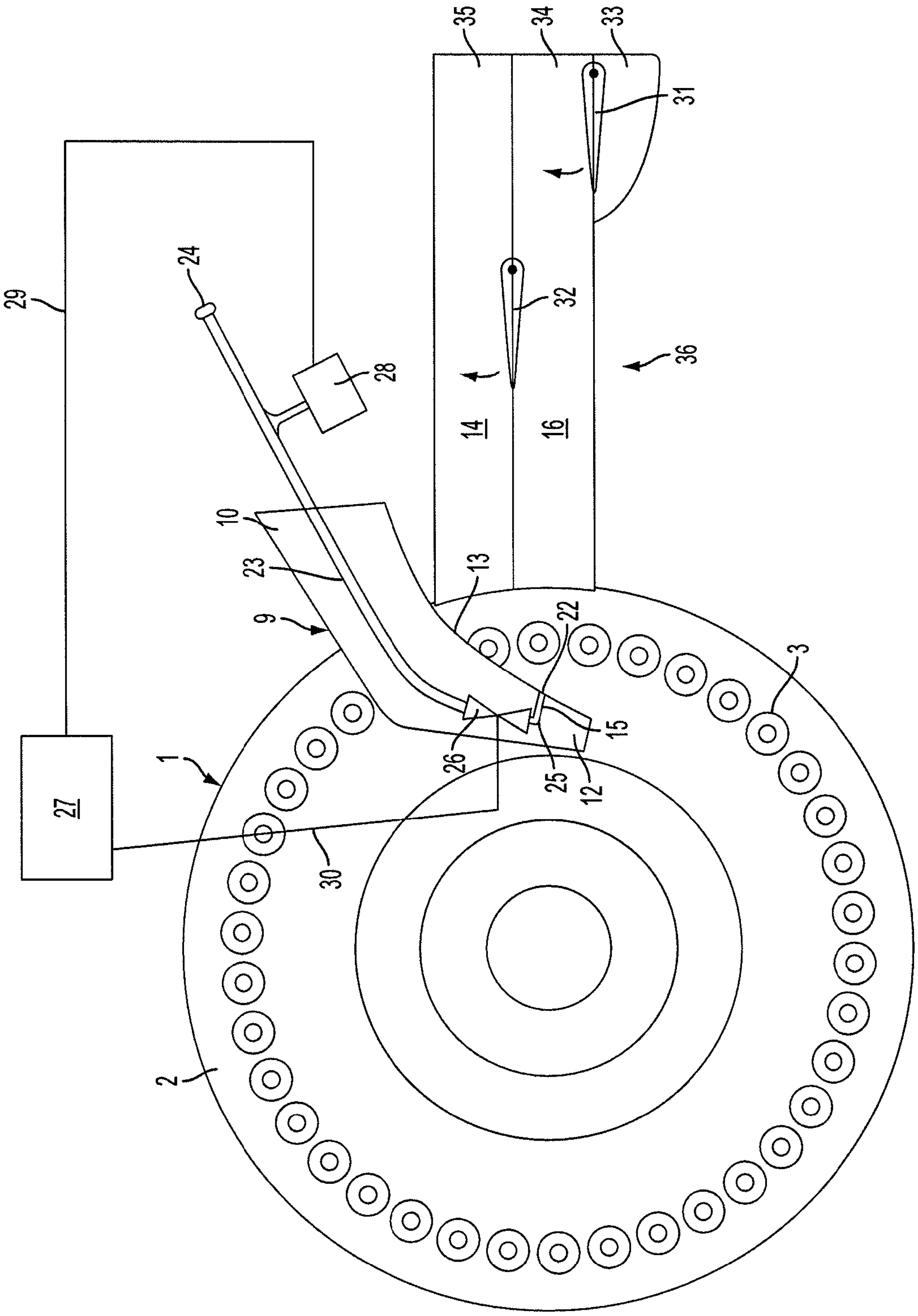
FIG. 3 is a top view of the turret of the rotary tablet press of FIGS. 1 and 2, but provided with another embodiment of the tablet chute.

FIG. 3 shows a top view of the turret of the rotary tablet press similar to that of FIG. 2, however provided with another embodiment of the tablet chute 36 that enables so-called single tablet sampling during production. This tablet chute 36 has a first pivotal guide flap 32 and a second pivotal guide flap 31. In FIG. 3, both pivotal guide flaps 31, 32 are in their straight positions which is used for automatic mode, whereby tablets led to the first channel 14 of the tablet chute are directed to a right outlet 35 for properly pressed tablets, and tablets led to the second channel 16 of the tablet chute are directed to a middle outlet 34 for defect tablets. If it is desired to sample a single or a few specific tablets during production, the second pivotal guide flap 31 is set to its right position for a period of time, and the control valve 26 is, during this period of time, activated in order for the ejection nozzle 15 to reject a single or more tablets into the second channel 16. These tablets are by means of the second pivotal guide flap 31 led to a left outlet 33 dedicated to sampled tablets. In manual mode, the first pivotal guide flap 32 is set in its right position, thereby leading tablets from the first channel 14 to the second channel 16 and out through the middle outlet 34. In manual mode, tablets may also be sampled by setting the second pivotal guide flap 31 in its right position, thereby leading them to the left outlet 33.

The opening of the ejection nozzle 15 is formed as a hole 22 in the curved guide plate 13 of the ejection finger 9. The ejection nozzle is supplied with compressed gas through a supply line 23 having an inlet end 24 for connection with a not shown source of compressed gas and having an outlet end 25 communicating with the ejection nozzle. The supply line 23 is provided with a control valve 26 controlled by a control unit 27 in order to open the supply line 23 when a tablet to be sorted out has been detected by the control unit 27. The control valve 26 is integrated into the free end 12 of the ejection finger 9 right beside the ejection nozzle 15 so that the reaction time from the opening of the control valve to the ejection of gas out through the opening 22 of the ejection nozzle 15 is very short. The control unit 27 decides whether a tablet is defective and should be sorted out on the basis of a monitoring of operational parameters of the tablet press, such as compression force or displacement of a punch during compression, for instance, among others. The monitored parameters may by indicative of qualities of the compressed tablets such as weight, hardness, thickness, dissolution and active dose, among others. This monitoring is well-known in the art and not indicated on the drawing.

Furthermore, the supply line 23 is provided with a sensor in the form of a pressure meter 28 arranged between the inlet end 24 of the supply line 23 and the control valve 26. The pressure meter 28 is located under the lower partition wall 7, below the pole 11, on which the ejection finger 9 is mounted, see FIG. 1. In FIG. 2, the arrangement of the pressure meter 28 is shown only very schematic.

The pressure measured by the pressure meter 28 is indicative of a gas flow through the supply line 23 and consequently also through the control valve 26. When the control valve 26 is closed, the static pressure in the supply line 23 generated by means of the not shown source of compressed gas is monitored by means of the control unit 27 on the basis of a pressure signal supplied from the pressure meter 28 to the control unit 27 through the electric line 29. The control unit 27 generates an error signal, in the case that this static pressure goes under a predetermined minimum pressure, for instance 6 barg. In this case, the supply pressure is not correct. When the control valve 26 is controlled to open by means of an electrical signal from the control unit 27 to the control valve 26 through an electric line 30, the pressure measured by the pressure meter 28 is also monitored, and in case that a predetermined pressure drop occurs after a predetermined reaction time, it is assumed that the control valve 26 has been opened properly, and that the ejection nozzle 15 functions properly; especially that the ejection nozzle is not clogged up. The predetermined pressure drop could, for instance, be a drop from 6.0 barg to 5.8 barg and is a result of the flow resistance in the supply line according to Poiseuille's law. In the opposite case, whereby said predetermined pressure drop does not occur, after said predetermined reaction time, it is assumed that either the control valve 26 has not been opened properly or that the ejection nozzle 15 does not function properly, for instance because it is clogged up. In that case, the control unit generates an error signal indicating that proper measured must be taken by the operator of the tablet press.

Instead of the pressure meter 28 other kinds of suitable sensors may also be applied in order to detect a variable indicative of a gas flow through the control valve 27. Especially, different kinds of standard flowmeter may by applied, such as a differential pressure flowmeter, an ultrasonic flowmeter, a target flowmeter, or a coriolis mass flowmeter.

The invention claimed is:

1. A rotary tablet press incorporating a system for rejection of tablets produced in the rotary tablet press, comprising an ejection nozzle (15) for direction of a gas jet at a tablet to be rejected, so that the tablet is redirected and thereby sorted out from the remaining tablets leaving the tablet press during production, the ejection nozzle (15) being supplied with compressed gas through a supply line (23) having an inlet end (24) for connection with a source of compressed gas and an outlet end (25) communicating with the ejection nozzle (15), the supply line (23) being provided with a control valve (26) controlled by a control unit (27) operable open the supply line (23) when a tablet to be sorted out has been detected by the control unit (27), and the supply line (23) being provided with a pressure sensor (28) adapted to detect a variable indicative of a gas flow through the control valve (26) the control unit (27) operable to generate an error signal in the case of malfunction of the control valve (26), characterized in that the sensor (28) is arranged in the supply line (23) between the control valve (26) and the inlet end (24) of the supply line (23), and in that the control valve (26) is arranged next to the ejection nozzle (15), wherein the control unit (27) is adapted to generate an error signal, if a predetermined drop of the pressure measured by the pressure sensor is not detected by the control unit, when the control valve (26) is opened.

2. A rotary tablet press according to claim 1, wherein the system comprises an ejection finger (9) adapted to guide tablets from a die table (2) of the tablet press into a first channel (14) of a tablet chute (8), and wherein the ejection nozzle (15) is arranged in the ejection finger (9) in order to direct tablets into a second channel (16) of the tablet chute (8).

3. A rotary tablet press according to claim 2, wherein the ejection finger (9) has a fixed end (10) adapted to be mounted beside the die table (2) and a free end (12) to be located above the die table (2), and wherein the control valve (26) is located at the free end (12) of the ejection finger (9).

4. A rotary tablet press according to claim 2, wherein the control valve (26) is integrated in the ejection finger (9).

5. A rotary tablet press according to claim 3, wherein the sensor (28) is arranged at the fixed end (10) of the ejection finger (9).

6. A rotary tablet press according to claim 3, wherein the fixed end (10) of the ejection finger (9) is mounted on the top of a pole (11) mounted on a dividing wall of a tablet press, and wherein the sensor (28) is arranged below the dividing wall and under the pole (11).

7. A rotary tablet press according to claim 6, wherein the supply line (23) is integrated into the pole (11) and the ejection finger (9).

8. A rotary tablet press according to claim 7, wherein the predetermined drop of pressure is at least 2 percent, and preferably at least 3 percent.

9. A rotary tablet press according to claim 7, wherein the control unit (27) is adapted to monitor the pressure measured by the pressure sensor (28), when the control valve (26) is closed, and further adapted to generate an error signal in response to monitoring the measured pressure below a minimum pressure.

10. A rotary tablet press according to claim 1, wherein the sensor (28) is a flowmeter, such as a differential pressure flowmeter, an ultrasonic flowmeter, a target flowmeter, a coriolis mass flowmeter or any kind of suitable flowmeter.

11. A method of rejection of tablets produced in a rotary tablet press, whereby a gas jet is directed at a tablet to be rejected, so that the tablet is redirected and thereby sorted out from the remaining tablets leaving the tablet press during production, whereby the compressed gas is supplied to the ejection nozzle (15) through a supply line (23) from a source of compressed gas, whereby a control valve (26) arranged in the supply line (23) next to the election nozzle (15) opens for the supply of gas when it receives a control signal from a control unit (27), the control unit (27) sending the control signal to the control valve (26) when it has detected a tablet to be sorted out, whereby a pressure sensor (28) arranged in the supply line (23) between the control valve (26) and the inlet end (24) of the supply line (23) detects a variable indicative of a gas flow through the control valve (26), and whereby the system generates an error signal in the case of malfunction of the control valve (26), whereby the variable is detected by the sensor (28) in the supply line (23) from the source of compressed gas to the control valve (26), and whereby the control valve (26) opens for the gas flow next to the ejection nozzle (15), whereby the control unit (27) generates an error signal, if a predetermined drop of the pressure measured by the pressure sensor (28) is not detected by the control unit (27), when the control valve (26) is opened.

12. A method of rejection of tablets according to claim 11, whereby successful tablets are guided by means of an ejection finger (9) from a die table (2) of the tablet press into a first channel (14) of a tablet chute (8), and whereby defective tablets are directed into a second channel (16) of the tablet chute (8) by means of a gas jet ejected through an ejection nozzle (15) arranged in the ejection finger (9).

13. A method of rejection of tablets according to claim 11, whereby the control valve (26) is opened inside the ejection finger (9).

14. A method of rejection of tablets according to claim 11, whereby the predetermined drop of pressure is at least 2 percent, and preferably at least 3 percent.

15. A method of rejection of tablets according to claim 11, the pressure measured by the pressure sensor (28) is monitored by the control unit (27), when the control valve (26) is closed, and an error signal is generated in response to monitoring the measured pressure below a minimum pressure.

16. A method of rejection of tablets according to claim 11, whereby the variable detected by the sensor (28) is a flow signal, and whereby the flow signal is measured by means of a differential pressure flowmeter, an ultrasonic flowmeter, a target flowmeter, a coriolis mass flowmeter or any kind of suitable flowmeter.

* * * * *